(12) United States Patent
Brazier et al.

(10) Patent No.: US 7,051,570 B2
(45) Date of Patent: May 30, 2006

(54) SYSTEM AND METHOD FOR MONITORING A PRESSURIZED SYSTEM

(75) Inventors: Geof Brazier, Woodbury, MN (US); John P. Clark, III, Tulsa, OK (US); John E. Smallwood, Tulsa, OK (US)

(73) Assignee: BS&B Safety Systems Limited (IE)

( * ) Notice: Subject to any disclaimer, the term of this patent is extended or adjusted under 35 U.S.C. 154(b) by 0 days.

(21) Appl. No.: 10/962,749

(22) Filed: Oct. 13, 2004

(65) Prior Publication Data

US 2005/0160786 A1 Jul. 28, 2005

Related U.S. Application Data

(63) Continuation of application No. 10/627,687, filed on Jul. 28, 2003, now Pat. No. 6,843,098, which is a continuation of application No. 09/916,687, filed on Jul. 30, 2001, now Pat. No. 6,598,454.

(51) Int. Cl.
*G01L 27/00* (2006.01)
*F16K 37/00* (2006.01)
*G08B 21/00* (2006.01)

(52) U.S. Cl. .................. 73/1.71; 137/557; 340/626
(58) Field of Classification Search .............. 73/1.71; 137/557, 551, 552; 340/611, 614, 626, 635, 340/653, 603, 605; 702/138
See application file for complete search history.

(56) References Cited

U.S. PATENT DOCUMENTS

| | | | |
|---|---|---|---|
| 3,129,722 A | 4/1964 | Wagner | |
| 3,462,994 A | 8/1969 | Maust | |
| 3,890,968 A | 6/1975 | Pierce et al. | |
| 4,101,872 A | 7/1978 | Pappas | |
| 4,155,073 A | 5/1979 | Ulch et al. | |
| 4,462,022 A | 7/1984 | Stolarczyk | |
| 4,551,710 A | 11/1985 | Troup et al. | |
| 4,991,655 A | 2/1991 | McHugh | |
| 5,074,626 A | 12/1991 | Kramer et al. | |
| 5,189,455 A | 2/1993 | Seim | |
| 5,278,539 A | 1/1994 | Lauterbach et al. | |
| 5,423,037 A | 6/1995 | Hvasshovd | |
| 5,448,221 A | 9/1995 | Weller | |
| 5,454,024 A | 9/1995 | Lebowitz | |
| 5,520,209 A | 5/1996 | Goins et al. | |
| 5,694,117 A | 12/1997 | Sugarek | |
| 6,041,645 A | 3/2000 | Lawson et al. | |
| 6,084,523 A | 7/2000 | Gelnovatch | |
| 6,137,417 A | 10/2000 | McDermott | |
| 6,182,497 B1 | 2/2001 | Krajci | |
| 6,188,715 B1 | 2/2001 | Partyka | |
| 6,240,948 B1 | 6/2001 | Hansen, III et al. | |
| 6,252,510 B1 | 6/2001 | Dungan | |
| 6,283,138 B1 | 9/2001 | Friend et al. | |
| 6,310,550 B1 | 10/2001 | Wagener | |
| 6,499,656 B1 | 12/2002 | Marsh et al. | |

FOREIGN PATENT DOCUMENTS

| | | |
|---|---|---|
| DE | 37 40 084 A1 | 6/1989 |
| GB | 2 287 068 | 9/1995 |
| JP | 4-236057 | 8/1992 |

*Primary Examiner*—Charles Garber
(74) *Attorney, Agent, or Firm*—Finnegan, Henderson, Farabow, Garrett & Dunner, LLP

(57) ABSTRACT

A system and method for monitoring a pressure relief device are provided. The system includes a release sensor that provides an indication when the pressure relief device activates. A wireless transmitter is connected to the release sensor and sends a wireless transmission having an activation signal when the indication is provided by the release sensor. A receiver receives the wireless transmission from the transmitter and generates a warning when the activation signal is identified.

28 Claims, 4 Drawing Sheets

SYSTEM AND METHOD FOR MONITORING A PRESSURIZED SYSTEM

This application is a continuation of U.S. application Ser. No. 10/627,687, filed Jul. 28, 2003 now U.S. Pat. No. 6,843,098, which is a continuation of U.S. application Ser. No. 09/916,687, filed Jul. 30, 2001, now U.S. Pat. No. 6,598,454 B2 all of which are incorporated herein by reference.

BACKGROUND OF THE INVENTION

This invention generally relates to a method and system for monitoring a pressurized system. More particularly, the present invention relates to a method and system for monitoring a pressure relief device.

Pressure relief devices are commonly used to protect systems that contain a pressurized fluid from experiencing potentially hazardous over-pressure conditions. The pressure relief devices are designed to activate, or open, when the pressure of the fluid within the system reaches a predetermined pressure limit that indicates an over-pressure condition for the particular system. The predetermined pressure limit is variable and depends upon the design considerations of the particular system.

The pressure relief devices, which may be, for example, rupture disks, pressure relief valves, safety valves, control valves, explosion panels, or other such devices, are connected to the system so that at least a portion of the pressure relief device is exposed to the fluid within the system. When the fluid reaches or exceeds the predetermined pressure limit, the force of the fluid on the pressure relief device acts on the pressure relief device to activate the pressure relief device, thereby creating an opening. Fluid may then escape from the system through the opening to relieve the over-pressure condition.

In some systems, it is important to closely monitor the system and the pressure relief device to determine, as quickly as possible, when the pressure relief device activates. Quick notification of the activation of the pressure relief device will allow an operator or automated system to respond to the over-pressure condition. The response taken will depend upon the particular system and may include: taking corrective action to remedy the cause of the over-pressure condition; triggering the implementation of additional safety functions; or providing notification of fluid release for system audit purposes.

In other systems, it is important to closely monitor the system and the pressure relief device to determine, as quickly as possible, when the pressure relief device exhibits leakage. Quick notification will allow an operator or automated system to respond to the leakage. The response taken will depend upon the particular system and may include: taking corrective action to remedy the cause of the over-pressure condition; triggering the implementation of additional safety functions; or providing notification of fluid release for system audit purposes.

Some pressure relief devices may include a sensor that indicates when the pressure relief device has activated. Some of these sensors include an electrical circuit. The electrical circuit is routed through the pressure relief device such that the opening of the pressure relief device interrupts the circuit. The interruption in the circuit senses that the pressure relief device has activated and that fluid is escaping from the system.

When the sensor determines that the pressure relief device has opened or exhibits leakage, this fact needs to be communicated to an operator or automated system who has the capability to react to the situation. The conventional sensor systems are typically hard-wired to a light, or other indicator, that is activated when the sensor identifies that the pressure relief device has functioned. The illumination of the light alerts the operator or automated system to the function of the pressure relief device. However, because the indicator is hard-wired, or directly connected to the sensor, there is significant cost to installation, especially for existing systems. There may be further inconvenience if the pressurized system is located in a remote location or in a remote part of a processing facility.

In light of the foregoing, there is a need for a method and system for monitoring a pressurized system that solves one or more of the problems set forth above.

SUMMARY OF THE INVENTION

Accordingly, the present invention is directed to a method and system for monitoring a pressurized system that obviates one or more of the limitations and disadvantages of prior art systems. The advantages and purposes of the invention will be set forth in part in the description which follows, and in part will be obvious from the description, or may be learned by practice of the invention. The advantages and purposes of the invention will be realized and attained by the elements and combinations particularly pointed out in the appended claims.

To attain the advantages and in accordance with the purposes of the invention, as embodied and broadly described herein, the invention is directed to a monitoring system for a pressure relief device that includes a release sensor that provides an indication when the pressure relief device activates. A transmitter is connected to the release sensor and sends a wireless transmission having an activation signal when the indication is provided by the release sensor. A receiver receives the wireless transmission from the transmitter and generates a warning signal when the activation signal is identified.

In another aspect, the invention is directed to a monitoring system for a pressurized system that includes a pressure relief device. A release sensor provides an indication when the pressure relief device activates. A transmitter is connected to the release sensor and sends a wireless transmission having an activation signal when the indication is provided by the release sensor. A receiver receives the transmission from the transmitter and generates a warning signal when the activation signal is identified.

In yet another aspect, the present invention is directed to a method of monitoring a pressure relief device. According to the method, an indication is provided when a pressure relief device activates. A wireless transmission is sent after the indication is provided. The wireless transmission includes an activation signal. The wireless transmission is received and a warning signal is generated when the activation signal is identified.

In still another aspect, the present invention is directed to a monitoring system for a pressurized system. The monitoring system includes a pressure relief device and a release sensor that is configured to provide an indication when the pressure relief device activates. A transmitter is connected to the release sensor and is configured to send a wireless transmission having a status signal when a first predetermined period of time elapses without the release sensor providing the indication. A receiver is configured to receive the wireless transmission from the transmitter.

In another aspect, the present invention is directed to a monitoring system for a pressurized system. The monitoring system includes a pressure relief device and a release sensor that is configured to provide an indication when the pressure relief device activates. A transmitter is connected to the release sensor and is configured to send a wireless transmission having an activation signal when the indication is provided by the release sensor. The activation signal includes an identity and location for the activated pressure relief device. A receiver is configured to receive the wireless transmission from the transmitter and to generate a warning signal when the activation signal is identified.

In still another aspect, the present invention is directed to a monitoring system for a pressurized system. The monitoring system includes a pressure relief device and a release sensor that is configured to provide an indication when the pressure relief device activates. A transmitter is connected to the release sensor and is configured to send a wireless transmission that has an identifying prefix that uniquely identifies the wireless transmission as being generated by the transmitter. A receiver is configured to receive the wireless transmission from the transmitter.

In yet another aspect, the present invention is directed to a monitoring system for a pressurized system. The monitoring system includes a pressure relief device and a release sensor configured to provide an indication when the pressure relief device activates. A transmitter is connected to the release sensor and is configured to send a wireless transmission having an activation signal when the indication is provided by the release sensor. An annunciator is in communication with the transmitter and is configured to provide an alert when the wireless transmission having the activation signal is received.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DETAILED DESCRIPTION

Reference will now be made in detail to the presently preferred embodiments of the present invention, examples of which are illustrated in the accompanying drawings. Wherever possible, the same reference numbers will be used throughout the drawings to refer to the same or like parts. An exemplary embodiment of a monitoring system for a pressure relief device is shown in FIG. 1 and is designated generally by reference number 10.

Figure 1:
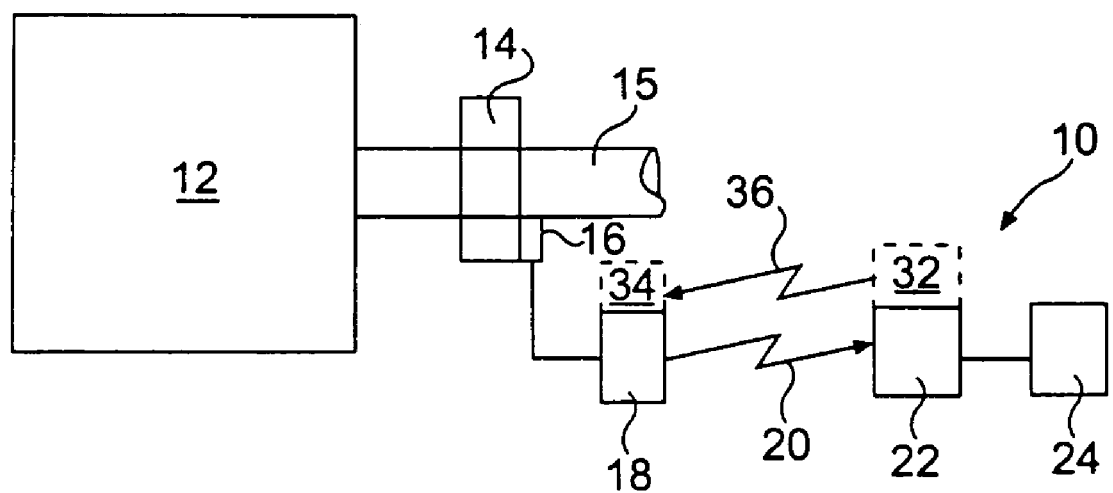
FIG. 1 is a schematic and diagrammatic view of a monitoring system for a pressurized system in accordance with the present invention.

As illustrated in FIG. 1, a pressure relief device 14 is connected to a system 12 that contains a pressurized fluid or a fluid that may become pressurized. Pressure relief device 14 may be, for example, a rupture disk, a pressure relief valve, a safety valve, an explosion vent, a control valve, or another type or relief device. Pressure relief device 14 is connected to system 12 so that at least a portion of pressure relief device 14 is exposed to the pressurized fluid. This connection may be accomplished in a variety of manners, such as, for example, placing pressure relief device 14 in a vent pipe 15.

Pressure relief device 14 is configured to activate, or open, when the fluid within system 12 reaches a predetermined pressure limit. The predetermined pressure limit may be indicative of an over-pressure condition for system 12 and may vary from system to system. The activation, or opening, of pressure relief device 14, creates an opening in pressure relief device 14.

As is known in the art, it is also possible for a pressure relief device to develop a leak or otherwise allow fluid to escape from the pressurized system. For the purposes of the present disclosure, any leak or other unexpected allowance of fluid flow through the pressure relief device 14 is also considered to be an activation, or opening, of pressure relief device 14.

The opening created by the activation of pressure relief device 14 allows fluid to escape from system 12. As fluid escapes system 12, the pressure within system 12 subsides. Vent pipe 15 may direct the escaping fluid into a reservoir (not shown). Alternatively, if the system fluid is not hazardous, vent pipe 15 may direct the escaping fluid to the environment.

In accordance with the present invention, a release sensor provides an indication when the pressure relief device activates and creates an expected or unexpected fluid pathway. The release sensor includes a mechanism, such as an electrically powered circuit or a pressure switch, that is connected to the pressure relief device. The activation of the pressure relief device triggers the mechanism, such as, for example, by interrupting the circuit. The triggering of the mechanism provides the indication that the pressure relief device has activated.

As schematically illustrated in FIG. 1, a release sensor 16 is operably connected to or associated with pressure relief device 14. Release sensor 16 may be any device readily apparent to one skilled in the art that provides an indication when pressure relief device 14 activates. In the exemplary embodiment illustrated in FIG. 2, pressure relief device 14 is a reverse-buckling rupture disk 26 disposed between an inlet safety head 23 and an outlet safety head 25. Release sensor 16 includes a wire 28 disposed proximate outlet safety head 25. Wire 28 is connected to a power source 30, which may be a battery. Power source 30 may be a part of release sensor 16 or may be included in transmitter 18 (described in greater detail below). Power source 30 and wire 28 form an electrically-powered circuit that traverses the fluid flow path of rupture disk 26.

Figure 2:
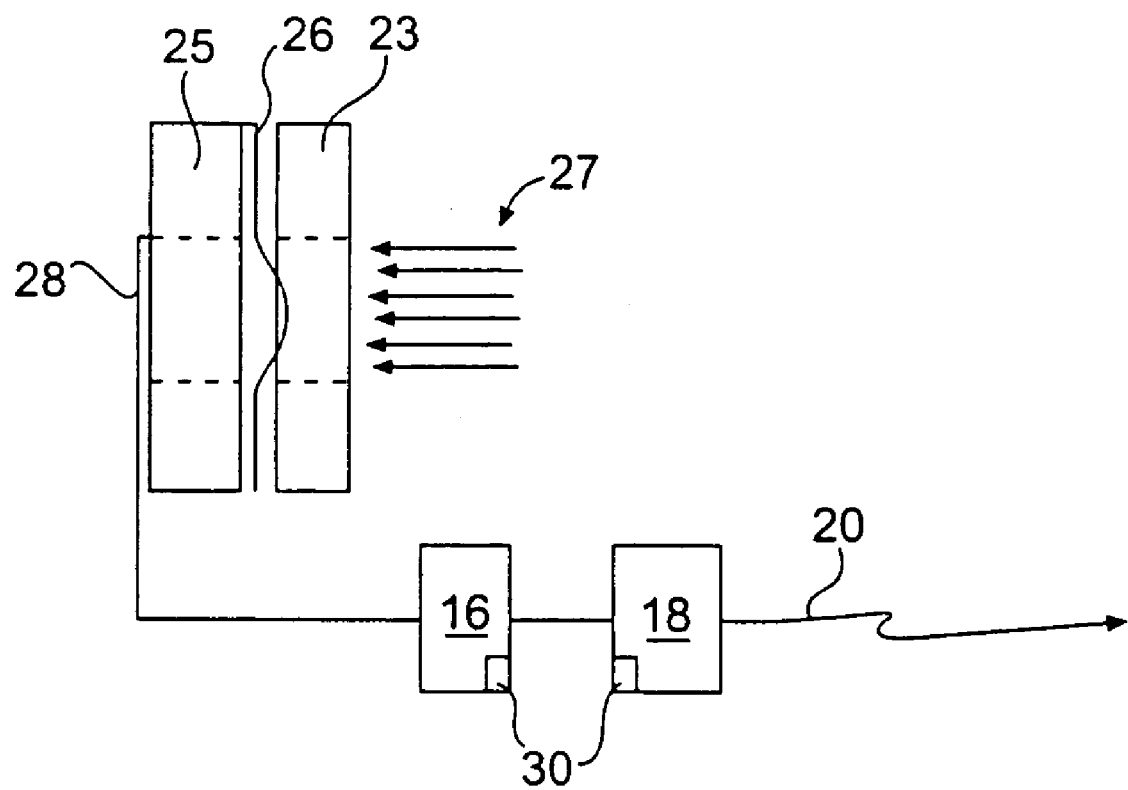
FIG. 2 is a schematic and diagrammatic view of a sensor and transmitter for a pressure relief device in accordance with the present invention.

Pressurized fluid from the system acts on rupture disk 26 in the direction indicated by arrows 27 (referring to FIG. 2). Rupture disk 26 will rupture when the force exerted on rupture disk 26 by the pressurized fluid exceeds the material strength of rupture disk 26. The rupture of rupture disk 26 will break wire 28 and create an opening through which fluid may escape the system. Should rupture disk 26 exhibit leakage, the space between 26 and 28 would become sufficiently pressurized to break an appropriately configured wire 28.

When wire 28 is broken the electrically-powered circuit changes from a closed circuit to an open circuit. In this embodiment, the opening of the circuit provides the indication that the pressure relief device has activated. The present invention contemplates, however, that different types of release sensors adapted for use with various pressure relief devices may provide different indications that the pressure relief device has activated.

In accordance with the present invention, a transmitter is connected to the release sensor. The transmitter sends a wireless-transmission having an activation signal when the indication is received from the release sensor. The transmitter may also send a wireless transmission that includes a status signal if a predetermined time period elapses without activation of the pressure relief device.

As illustrated in FIG. 1, a transmitter 18 is operably connected to release sensor 16 by, for example, a length of shielded cable. Transmitter 18 is configured to emit a wireless transmission 20. In the currently contemplated embodiment, wireless transmission 20 is a RF transmission that has a frequency of around 900 MHz. The present invention contemplates, however, that wireless transmission 20 may occur at any licensed or unlicensed RF frequency band or at some other acceptable frequency.

In the currently contemplated embodiment, wireless transmission 20 may include two types of signals: a status signal and an activation signal. Transmitter 18 emits the status signal to provide notice that monitoring system 10 is operating normally. In the currently contemplated embodiment, the status signal is sent on a periodic time basis, such as, for example, every minute. The status signal includes a basic code to indicate that the pressure relief device is still being monitored, but has not yet activated. The status signal may further include additional information regarding the status of the pressure relief device and release sensor. This additional information may include, for example, information relating to the current voltage or percentage life of battery 30, or other power source, in release sensor 16.

Transmitter 18 emits the activation signal when release sensor 16 provides the indication that pressure relief device 14 has activated. The activation signal may be sent once or on a repeated basis, such as, for example, every second. Transmitter 18 may be programmed to emit a generic activation signal or transmitter 18 may be programmed to emit a unique activation signal that provides additional information, such as the identity and/or location of the particular pressure relief device 14 that activated.

Transmitter 18 may be further programmed to include an identifying prefix with each wireless transmission 20. The identifying prefix may uniquely identify the transmission as being generated by a wireless transmitter of monitoring system 10. In this manner, wireless transmissions 20 of monitoring system 10 may be differentiated from other transmissions that may be traveling through the same air waves.

In accordance with the present invention, a receiver receives the transmissions sent by the transmitter. The receiver operates at the same frequency range as the wireless transmitter. The receiver generates a warning signal when the activation signal is received and identified. The receiver may be placed in a fixed position relative to the transmitter. Alternatively, the receiver may be a moveable device and utilize conventional wireless technology, such as a pager or cellular phone.

As illustrated in FIG. 1, a receiver 22 is in communication with transmitter 18. Receiver 22 is configured to receive transmissions sent in the same frequency band used by transmitter 18. The present invention contemplates that receiver 22 and transmitter 18 may communicate through any number of communication protocols, including, for example: short range wireless standards such as bluetooth; $3^{rd}$ generation digital phone service; global system for mobile communication "GSM"/code-division multiple acess "CDMA"; short message service "SMS"; wireless Ethernet "Wi-Fi"; or wireless application protocol "WAP."

If wireless transmission 20 includes an identifying prefix, receiver 22 ensures that the first portion of wireless transmission 20 matches the identifying prefix. If the identifying prefix does not match, receiver 22 may disregard the transmission. If the identifying prefix matches the expected prefix, receiver 22 determines whether wireless transmission 20 includes an activation signal or a status signal. If wireless transmission 20 includes an activation signal, receiver 22 generates a warning signal to indicate that pressure relief device 14 has activated. The warning signal may be an illuminated light, a generated sound, or a communication with an annunciator (as described in greater detail below).

If wireless transmission 20 includes a status signal, receiver 22 processes the status information. If receiver 22 determines that there is a problem with the release sensor, such as, for example, a low power supply, receiver 22 may generate a warning signal to inform the operator that the power supply should be replaced or otherwise maintained.

Receiver 22 may include an internal timing device that measures the time between wireless transmissions 20 from transmitter 18. If a predetermined time period passes without receipt of a transmission, receiver 22 may generate a warning signal to inform an operator that no transmissions have been received and that there is a potential problem with transmitter 18.

Alternatively, as illustrated in FIG. 1, receiver 22 may be equipped with a transmitter 32 and transmitter 18 may be equipped with a receiver 34 to allow two-way communication. If the predetermined time period passes without receipt of transmission 20, transmitter 32 may send a transmission 36 having an interrogation signal to receiver 34. If receiver 34 and transmitter 18 are operating normally, transmitter 18 will generate a transmission 20 having a status signal upon receipt of the interrogation signal. If, however, no response to the interrogation signal is received by receiver 22, receiver 22 may generate a warning signal to inform the operator that there is a potential problem with transmitter 18.

As also illustrated in FIG. 1, monitoring system 10 may include an annunciator 24 in communication with receiver 22. Receiver 22 may communicate the warning signal to annunciator 24. The warning signal may include, for example, an indication that the power source is low, an indication of a communication problem with transmitter 18, or an indication that pressure relief device 14 has activated. It is contemplated, however, that this information may also be directly communicated from transmitter 18 to annunciator 24.

Annunciator 24 provides an alert in response to the warning generated by receiver 22. Annunciator 24 may be physically connected to receiver 22 and the alert may be the activation of a device such as a light, light emitting diode, sound generating device, a display monitor that displays a message corresponding to the warning signal, or a combination of such techniques. The present invention further contemplates that annunciator 24 may be a remote paging device such as, for example, a pager or a cellular phone with wireless communication between receiver 22 and annunciator 24.

Figure 3:
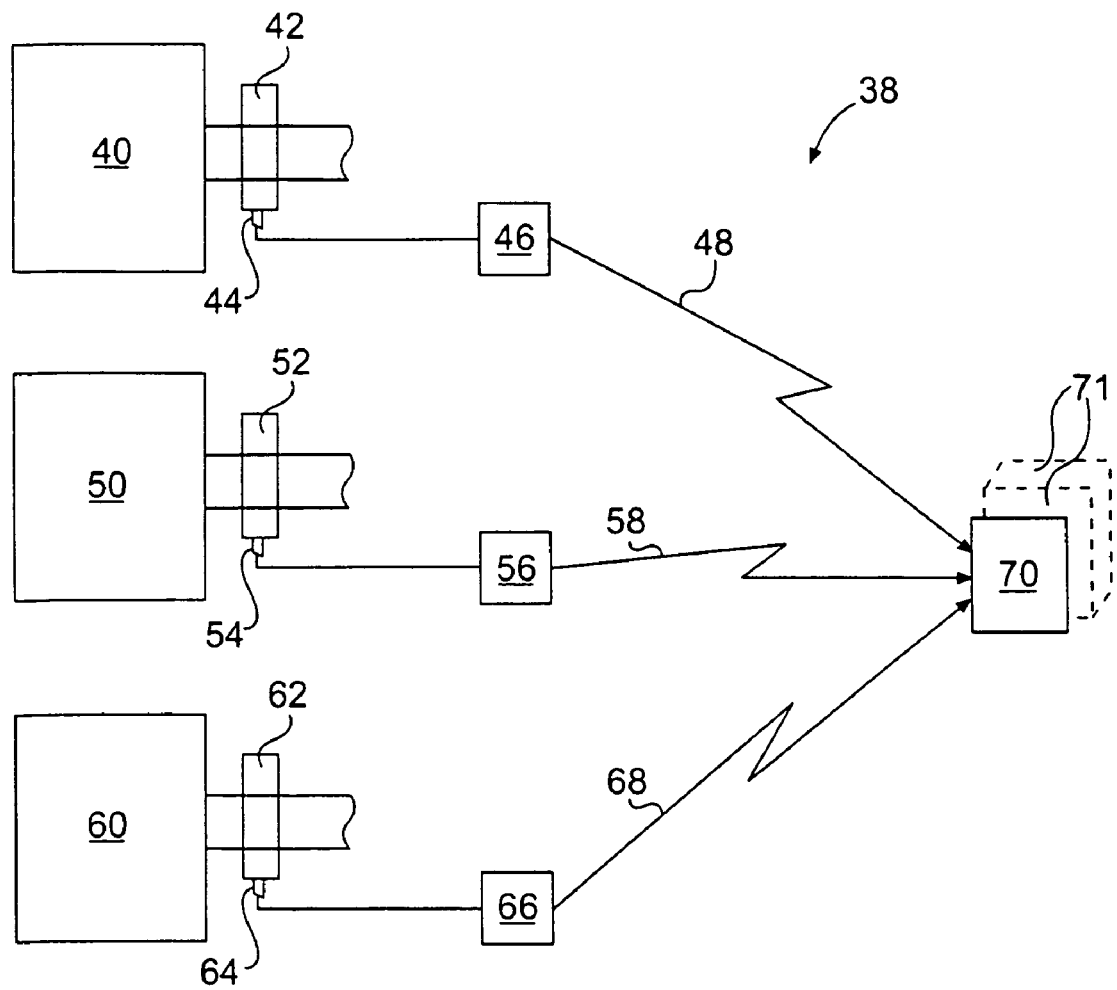
FIG. 3 is a schematic and diagrammatic view of another embodiment of a monitoring system for a pressurized system in accordance with the present invention.

As shown in FIG. 3, a monitoring system 38 according to the present invention may be used with multiple pressure relief devices 42, 52, 62 that are engaged with multiple sealed systems 40, 50, 60 or that are engaged in different locations within the same sealed system. As shown, a release sensor 44, 54, 64 is connected to each of pressure relief devices 42, 52, 62 and to a wireless transmitter 46, 56, 66.

Each release sensor 44, 54, 64 provides an indication when the corresponding pressure relief devices 42, 52, 62 activates. When an indication is generated, the respective wireless transmitter 46, 56, 66 generates a wireless transmission 48, 58, 68 having an activation signal. A receiver 70 is placed in communication with transmitters 46, 56, 66 to receive wireless transmissions 48, 58, 68. Multiple receivers 71 may be provided to simultaneously receive wireless transmissions from multiple transmitters 46, 56, 66 so that loss of transmission reception by one receiver does not create an overall system communication problem.

Each transmitter 46, 56, 66 may be programmed to include an identifying code at the beginning of each wireless transmission. The identifying code may be unique to each transmitter 46, 56, 66 or the identifying code may be common across all transmitters 46, 56, 66. Receiver 70 may be programmed to process only those transmissions that have the appropriate identifying code. In this manner, receiver 70 can effectively ignore other, random transmissions that were not sent by a transmitter of monitoring system 10.

Figure 4:
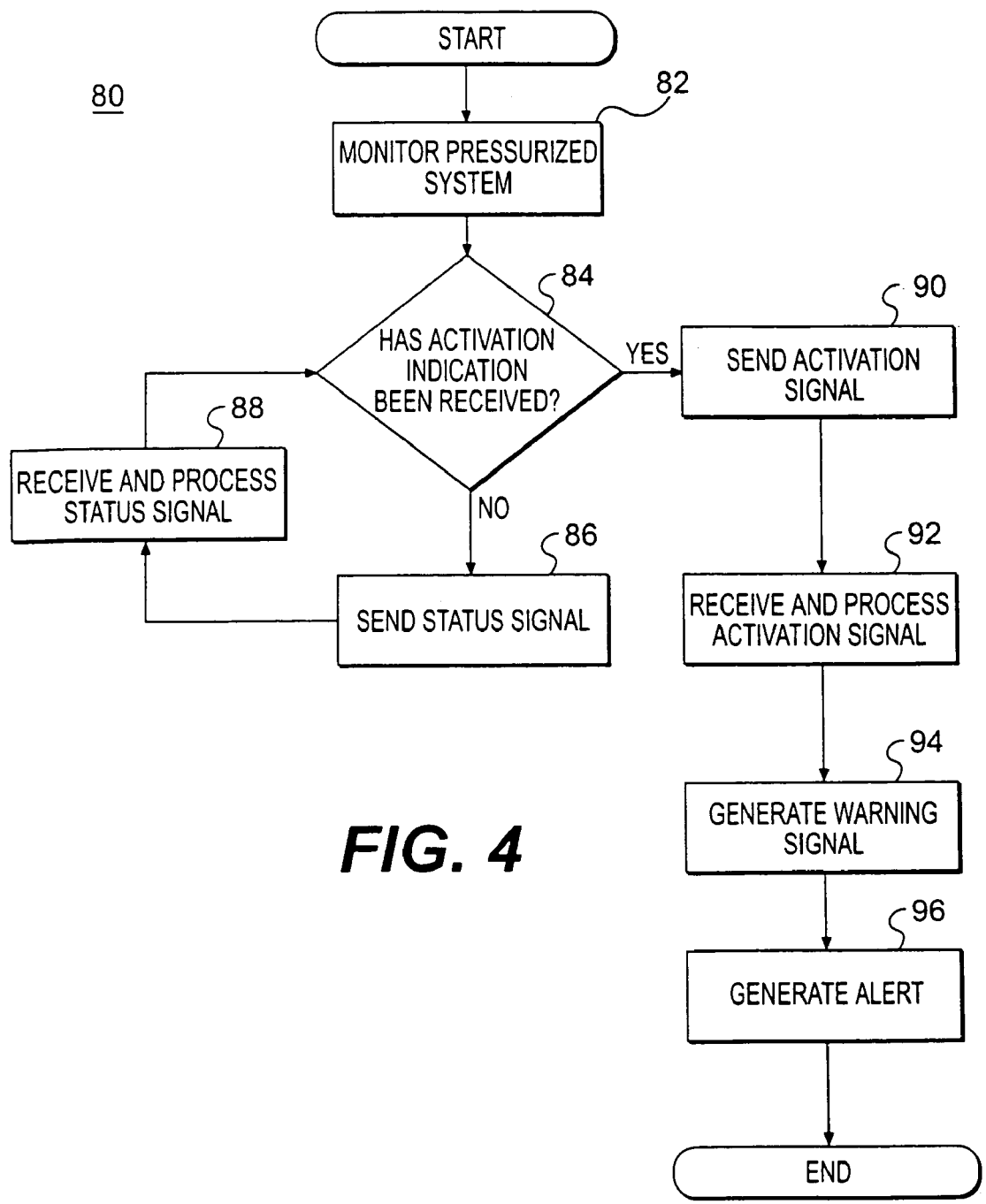
FIG. 4 is a flowchart illustrating a method for monitoring a pressurized system in accordance with the present invention.

The operation of the aforementioned monitoring system will now be described with reference to the attached drawings and, in particular, with reference to an exemplary method 80 for monitoring a pressurized system as illustrated in FIG. 4.

As illustrated in FIG. 1, pressurized system 12 is operated with a pressurized fluid. Monitoring system 10 monitors pressurized system 12 (step 82). Under normal operating conditions, when the fluid within system 12 remains below the predetermined pressure limit, pressure relief device 14 will not activate. If release sensor 16 does not provide an indication that pressure relief device 14 has activated (step 84) for a certain predetermined period of time, transmitter 18 will emit a wireless transmission 20 that includes a status signal (step 86). Wireless transmission 20 may include an identifying code that uniquely identifies the wireless transmission as being produced by monitoring system 10.

Receiver 22 receives and processes wireless transmission 20 (step 88). If an identifying code is included with wireless transmission 20, receiver 22 verifies that wireless transmission 20 is part of monitoring system 10. If so, then receiver 22 analyzes the information provided in the status signal. This information may include a representation of the voltage or other status of the power source of release sensor 16. If receiver 22 identifies a problem within the status signal, such as, for example, a low battery, receiver 22 generates a warning signal indicative of the particular problem. In addition, if receiver 22 does not receive any transmissions 20 from transmitter 18 for a certain period of time, receiver generates a warning signal that indicates a potential problem with transmitter 18.

If the pressure of the fluid in system 12 reaches or exceeds the predetermined limit for the system, pressure relief device 14 will activate to allow fluid to escape the system. Release sensor 16 provides an indication that pressure relief device 14 has activated. The indication may be, for example, the opening of a battery-powered circuit or the operation of a pressure switch.

In response to the indication, transmitter 18 sends a wireless transmission 20 having an activation signal (step 90). As described previously, this transmission may also include an identifying prefix. Transmitter 18 may send a series of wireless transmissions 20 with the activation signal to ensure that the transmission is received promptly.

Receiver 22 receives and processes the activation signal (step 92). After receiver 22 verifies the identification prefix of wireless transmission 20, receiver 22 analyzes the information contained in the activation signal. The activation signal information may include a simple code indicating that pressure relief device 14 has activated. In addition, the activation signal may include more detailed information, such as, for example, the location and/or identity of the activated pressure relief device.

Receiver 22 then generates a warning signal (step 94). The warning signal may be the activation of a light generating device or a sound generating device or the transmission of information to a remote annunciator device that generates an alert. In addition, the warning signal may be communicated to a local annunciator 24, which generates an alert (step 96). The alert may be implemented by displaying a warning message on a display monitor or by activating a remote paging device. It is contemplated that the message displayed or paged will contain as much information as possible regarding the problem. For example, the message may indicate that the power source is low, the transmitter is not transmitting, or the identity of an activated pressure relief device.

The present invention, therefore, provides a system and method for monitoring a pressurized system. The described system and method allow for the quick detection of an activated pressure relief device. Information relating to the activation of the pressure relief device may be effectively and efficiently communicated to an operator or automated system at any location and distance from the pressure relief device.

It will be apparent to those skilled in the art that various modifications and variations can be made in the method and system for monitoring a pressure relief device without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A monitoring system for a pressure relief device, comprising:
   a release sensor configured to provide an indication when the pressure relief device activates;
   a first communication device connected to the release sensor and configured to send a wireless transmission having an activation signal when the indication is provided by the release sensor and configured to send a wireless transmission having a status signal when a first predetermined period of time elapses without the release sensor providing the indication, each wireless transmission including an identifier indicating that the wireless transmission is sent by the first communication device;
   a second communication device configured to receive the wireless transmissions from the first communication device and configured to verify each wireless transmission received; and wherein a warning signal is generated when the first predetermined period of time elapses without the second communication device receiving the wireless transmission having the status signal.

2. The system of claim 1, wherein the second communication device is configured to send an interrogation signal to the first communication device when the first predetermined period of time elapses without receiving the wireless transmission having the status signal.

3. The system of claim 1, wherein a warning signal is generated when the activation signal is identified.

4. The system of claim 2, wherein the first communication device is configured to generate a wireless transmission having a responsive signal in response to the interrogation signal from the second communication device.

5. The system of claim 4, wherein the second communication device generates a warning signal when a second predetermined period of time elapses from the sending of the interrogation signal without receiving the wireless transmission having the responsive signal.

6. The system of claim 1, further comprising an annunciator in communication with the second communication device and configured to provide an alert when the warning signal is generated.

7. The system of claim 6, wherein the annunciator includes one of a display monitor, a pager, and a light emitting diode.

8. The system of claim 1, wherein the release sensor includes a wire configured to be broken when the pressure relief device activates.

9. The system of claim 1, wherein the first communication device includes a battery and the status signal includes a representation of the battery voltage.

10. The system of claim 1, wherein the release sensor includes a battery and the status signal includes a representation of the battery voltage.

11. The system of claim 1, wherein the status signal includes information regarding the status of the pressure relief device.

12. A monitoring system for a pressurized system, comprising:
   a pressure relief device;
   a release sensor configured to provide an indication when the pressure relief device activates;
   a first communication device connected to the release sensor and configured to send a wireless transmission having an activation signal, on a repeated basis, when the indication is provided by the release sensor and configured to send a wireless transmission having a status signal when a first predetermined period of time elapses without the release sensor providing the indication; and
   a second communication device configured to receive the wireless transmissions from the first communication device and to send an interrogation signal to the first communication device when the first predetermined period of time elapses without receiving the wireless transmission having the status signal.

13. The system of claim 12, wherein the second communication device generates a warning signal when the activation signal is identified.

14. The system of claim 12, wherein the first communication device is configured to generate a wireless transmission having a responsive signal in response to the interrogation signal from the second communication device.

15. The system of claim 14, wherein the second communication device generates a warning signal when a second predetermined period of time elapses from the sending of the interrogation signal without receiving the wireless transmission having the responsive signal.

16. The system of claim 12, further comprising an annunciator in communication with the second communication device and configured to provide an alert when the second communication device generates the warning signal.

17. The system of claim 16, wherein the annunciator includes one of a display monitor, a pager, and a light emitting diode.

18. The system of claim 12, wherein the release sensor includes a wire configured to be broken when the pressure relief device activates.

19. The system of claim 12, wherein the first communication device includes a battery and the status signal includes a representation of the battery voltage.

20. The system of claim 12, wherein the release sensor includes a battery and the status signal includes a representation of the battery voltage.

21. The system of claim 12, wherein the activation signal includes information regarding one or both of the identity and location of the activated pressure relief device.

22. The system of claim 12, wherein the second communication device is configured to verify each wireless transmission received.

23. A method of monitoring a pressure relief device, comprising the steps of:
   providing an indication when a pressure relief device activates;
   sending a wireless transmission, on a repeated basis, with a first communication device when the indication is provided, the wireless transmission including an activation signal;
   sending a wireless transmission having a status signal when a first predetermined period of time elapses without receiving the indication;
   receiving the wireless transmission with a second communication device; and
   verifying each wireless transmission received at the second communication device from the first communication device.

24. The method of claim 23, further including sending an interrogation signal to the first communication device when the first predetermined period of time elapses without receiving a wireless transmission having the status signal.

25. The method of claim 23, further including generating a warning signal when the activation signal is identified.

26. The method of claim 23, further including returning a wireless transmission having a responsive signal from the first communication device in response to the interrogation signal.

27. The method of claim 26, further including generating a warning signal when a second predetermined period of time elapses from the sending of the interrogation signal without receiving the wireless transmission having the responsive signal.

28. The method of claim 23, further comprising the step of generating a warning signal when the first predetermined amount of time passes without receiving the wireless transmission having the status signal.

* * * * *